(12) United States Patent
Kim

(10) Patent No.: US 9,816,424 B2
(45) Date of Patent: Nov. 14, 2017

(54) SYSTEM FOR CONTROLLING EXHAUST HEAT RECOVERY AND EXHAUST GAS RECIRCULATION SYSTEM

(71) Applicant: HYUNDAI MOTOR COMPANY, Seoul (KR)

(72) Inventor: Han Sang Kim, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/959,726

(22) Filed: Dec. 4, 2015

(65) Prior Publication Data
US 2017/0082008 A1 Mar. 23, 2017

(30) Foreign Application Priority Data
Sep. 23, 2015 (KR) .......................... 10-2015-0134275

(51) Int. Cl.
| | | |
|---|---|---|
| *F01N 3/00* | (2006.01) | |
| *F01N 3/02* | (2006.01) | |
| *F01N 5/02* | (2006.01) | |
| *F02M 26/22* | (2016.01) | |
| *F02M 26/51* | (2016.01) | |
| *F01N 3/10* | (2006.01) | |

(52) U.S. Cl.
CPC ............... *F01N 5/02* (2013.01); *F02M 26/22* (2016.02); *F02M 26/51* (2016.02); *F01N 3/101* (2013.01); *F01N 2570/14* (2013.01); *Y02T 10/16* (2013.01)

(58) Field of Classification Search
CPC ........ F01N 2570/14; F01N 3/101; F01N 5/02; F01N 2240/02; F01N 2240/10; F01N 2260/02; F01N 2260/024; F01N 3/0234; F01N 3/0205; F02M 26/22; F02M 26/51
USPC .................................... 60/278, 298, 299, 320
See application file for complete search history.

(56) References Cited

U.S. PATENT DOCUMENTS 6,155,042 A * 12/2000 Perset ..................... F01N 3/043
 123/568.12
6,543,427 B2 * 4/2003 Kawasaki .............. F02M 26/16
 123/568.12

(Continued)

FOREIGN PATENT DOCUMENTS

| JP | 11-193753 A | 7/1999 |
| JP | 2001-207919 A | 8/2001 |

(Continued)

*Primary Examiner* — Phutthiwat Wongwian
*Assistant Examiner* — Diem Tran
(74) *Attorney, Agent, or Firm* — McDermott Will & Emery LLP

(57) ABSTRACT

A system for controlling exhaust heat recovery and an exhaust gas recirculation system (EGR), the system includes an exhaust gas post processing device mounted on an outlet of an engine exhaust manifold, an exhaust gas purifying device, an exhaust heat recovery chamber having an exhaust gas pick-up space and further having a structure in which a cooling water flow passage is formed on the outside, and further being mounted on the outlet of the exhaust gas post processing device, a bypass valve mounted on an outlet of the exhaust heat recovery, and an EGR valve mounted on the exhaust heat recovery chamber to be opened and closed to circulate the exhaust gas in the exhaust gas pick-up space to an EGR cooler and an engine intake manifold.

13 Claims, 3 Drawing Sheets

(56) References Cited

U.S. PATENT DOCUMENTS

| | | | | |
|---|---|---|---|---|
| 6,568,179 | B2 * | 5/2003 | Deeba | F01N 3/0814 60/288 |
| 6,708,485 | B2 * | 3/2004 | Hinder | F01N 3/0814 60/288 |
| 7,921,640 | B2 * | 4/2011 | Major | F02G 5/02 165/51 |
| 8,904,772 | B2 * | 12/2014 | Azuma | F01N 3/2889 165/254 |

FOREIGN PATENT DOCUMENTS

| | | |
|---|---|---|
| JP | 2009-127547 A | 6/2009 |
| JP | 2009-138558 A | 6/2009 |
| JP | 2010-180818 A | 8/2010 |
| JP | 2013-189938 A | 9/2013 |
| JP | 2013-249012 A | 12/2013 |
| KR | 20-1998-0040940 U | 9/1998 |
| KR | 10-2009-0061986 A | 6/2009 |
| KR | 10-2013-0126506 A | 11/2013 |

* cited by examiner

SYSTEM FOR CONTROLLING EXHAUST HEAT RECOVERY AND EXHAUST GAS RECIRCULATION SYSTEM

CROSS-REFERENCE TO RELATED APPLICATION

This application claims under 35 U.S.C. §119(a) the benefit of priority to Korean Patent Application No. 10-2015-0134275, filed on Sep. 23, 2015 with the Korean Intellectual Property Office, the entire contents of which are incorporated herein by reference.

TECHNICAL FIELD

The present disclosure relates to a system for controlling exhaust heat recovery for a vehicle and an exhaust gas recirculation system (EGR). More particularly, it relates to a system for controlling exhaust heat recovery for a vehicle and an EGR which can improve fuel efficiency and achieve a heating effect in the wintertime as well as increasing cooling efficiency of an EGR cooler.

BACKGROUND

Various technologies that reduce exhaust gases such as nitrogen oxide, and the like, have been developed according to exhaust gas discharge regulations for vehicles, and one technology among the technologies can be an exhaust gas recirculation system (EGR) which can recirculate some of the exhaust gases to an intake side of an engine to reduce a discharge of NOx, and the like, which are included in the exhaust gas.

The EGR delivers some of exhaust gases that flow through an exhaust line to an intake manifold through an EGR valve to supply some exhaust gas to a combustion chamber together with mixed gas, and as a result, the EGR serves to reduce the generation of emissions such as NOx by preventing a combustion temperature from rising.

In this case, high-temperature exhaust gas delivered through a route of the EGR is not directly supplied to the combustion chamber and exchanges heat with cooling water in an EGR cooler to be supplied after the temperature thereof decreases. The reason for the cooling is that when the temperature of the exhaust gas supplied through the EGR route is high, a combustion characteristic deteriorates and fuel efficiency is adversely affected.

As another technology for reducing the exhaust gas according to exhaust gas discharge regulations for vehicles, a three-element catalyst device for purifying the exhaust gas is mounted on an exhaust pipe connected to an exhaust manifold.

As the three-element catalyst device, there is a trend that an exhaust gas post processing device (warming-up catalytic converter (WCC) is mounted close to the exhaust manifold of an engine so that warming-up is more rapidly performed and an exhaust gas purifying device (under-body catalytic converter (UCC)) mounted on a rear end of the exhaust gas post processing device are together used by considering that an exhaust gas regulation value gradually opens.

Meanwhile, the high-temperature exhaust gas that flows at front and rear ends of the exhaust gas purifying device is picked up to be supplied to the combustion chamber through the EGR cooler in the EGR, and as a result, the use of gas on the front end of the exhaust gas post processing device is excluded. Therefore, efficiency deteriorates in terms of using the exhaust gas.

When the exhaust gas is extracted on the front and rear ends of the exhaust gas purifying device and the front and rear ends of the exhaust gas post processing device to increase EGR use efficiency, a full potential of the exhaust gas can be used in various steps including a step just after starting, a warming-up step, a step after warming-up, and the like. As a result, various benefits including enhancement of merchantability, enhancement of the fuel efficiency and reduction of a generation amount of NOx can be maximized.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art. The present disclosure is made by considering that when warming-up ends, in which the temperature of an exhaust gas post processing device or an exhaust gas purifying device rises up to a temperature to purify exhaust gas, the temperature of exhaust gas passing through the exhaust gas post processing device or the exhaust gas purifying device gradually becomes a high temperature and the present disclosure has also been made in an effort to provide a system for controlling exhaust heat recovery and an EGR, which picks up exhaust gas on a rear end of an exhaust gas purifying device before warming-up and recirculates the picked up exhaust gas to an EGR cooler at an initial stage after an engine starts and picks up exhaust gas that flows between a front end of an exhaust gas post processing device or a rear end of the exhaust gas post processing device and a front end of the exhaust gas purifying device and recirculates the picked up exhaust gas to the EGR cooler from the time when the warming-up of the exhaust gas purifying device ends to increase cooling efficiency of the EGR cooler.

The present disclosure has also been made in an effort to improve fuel efficiency and a heating effect in the wintertime as well as increasing cooling efficiency of an EGR cooler by picking up and using exhaust gas on a front end of an exhaust gas post processing device according to a fuel efficiency mode and a heating mode from an initial stage after an engine starts by dividing a mode for controlling exhaust heat recovery and an EGR into the fuel efficiency mode and the heating mode and purifying the exhaust sequentially through the exhaust gas post processing device and an exhaust gas purifying device while stopping an EGR in a rapid acceleration mode.

In one aspect, the present disclosure provides a system for controlling exhaust heat recovery and an EGR, including: an exhaust gas post processing device mounted on an outlet of an engine exhaust manifold; an exhaust gas purifying device mounted on an exhaust line that extends from an outlet of the exhaust gas post processing device; an exhaust heat recovery chamber having an exhaust gas pick-up space capable of picking up and confining at least one of exhaust gas that flows on a rear end of the exhaust gas purifying device, exhaust gas that flows on a front end of the exhaust gas post processing device, and exhaust gas that flows on a rear end of the exhaust gas post processing device therein, having a structure in which a cooling water flow passage for exchanging heat with the exhaust gas is formed on the outside, and mounted on the outlet of the exhaust gas post processing device; a bypass valve mounted on an outlet of the exhaust heat recovery chamber to be opened/closed to temporarily confine the exhaust gas or bypass to the exhaust gas purifying device; and an EGR valve mounted in the exhaust heat recovery chamber to be opened/closed to circulate the exhaust gas in the exhaust gas pick-up space to an EGR cooler and an engine intake manifold.

In a preferred embodiment, a heat exchanger for exchanging heat between the cooling water in the cooling water flow passage and the exhaust gas in the exhaust gas pick-up space may be further mounted on an inner wall surface of the exhaust heat recovery chamber.

In another preferred embodiment, a first exhaust gas recovery line having a first opening/closing valve may be connected between the rear end of the exhaust gas purifying device and the exhaust gas pick-up space of the exhaust heat recovery chamber.

In still another preferred embodiment, a second exhaust gas recovery line having a second opening/closing valve may be connected between the front end of the exhaust gas post processing device and the exhaust gas pick-up space of the exhaust heat recovery chamber.

In yet another preferred embodiment, during a predetermined period until the exhaust gas purifying device and the exhaust gas post processing device are warmed up after an engine starts, the exhaust gas on the rear end of the exhaust gas purifying device may be supplied into the exhaust gas pick-up space of the exhaust heat recovery chamber.

In still yet another preferred embodiment, when the engine starts and thereafter, the exhaust gas purifying device is warmed up, the exhaust gas that flows between the rear end of the exhaust gas post processing device and a front end of the exhaust gas purifying device may remain in the exhaust gas pick-up space of the exhaust heat recovery chamber.

In a further preferred embodiment, when the engine starts and thereafter, both the exhaust gas purifying device and the exhaust gas post processing device are warmed up, the exhaust gas on the front end of the exhaust gas post processing device may be supplied into the exhaust gas pick-up space of the exhaust heat recovery chamber.

In another aspect, the present disclosure provides a system for controlling exhaust heat recovery and an EGR, including: an exhaust gas post processing device mounted on an outlet of an engine exhaust manifold; an exhaust gas purifying device mounted on an exhaust line that extends from an outlet of the exhaust gas post processing device; an exhaust heat recovery chamber having therein an exhaust gas pick-up space capable of picking up and confining exhaust gas that flows on the front end of the exhaust gas post processing device, having a structure in which a cooling water flow passage for exchanging heat with the exhaust gas is formed on the outside, and mounted between a joint of the exhaust manifold and an inlet of the exhaust gas post processing device; a bypass valve mounted on an outlet of the exhaust heat recovery chamber to be opened/closed to temporarily confine the exhaust gas or bypass to the exhaust gas post processing device; and an EGR valve mounted on the exhaust heat recovery chamber to be opened/closed to circulate the exhaust gas in the exhaust gas pick-up space to an EGR cooler and an engine intake manifold.

In a preferred embodiment, a heat exchanger for exchanging heat between cooling water in the cooling water flow passage and the exhaust gas in the exhaust gas pick-up space may be further mounted on an inner wall surface of the exhaust heat recovery chamber.

In another preferred embodiment, an inlet and an outlet of the cooling water flow passage may be connected with a cylinder block or a heater core so as to circulate cooling water by a switching operation of a 3-way valve.

In still another preferred embodiment, an exhaust gas feed-back passage may be connected between the exhaust gas pick-up space and the joint of the engine exhaust manifold and a pump pumping the exhaust gas in the exhaust gas pick-up space to the joint of the engine exhaust manifold may be mounted on the exhaust gas feed-back passage.

In yet another preferred embodiment, after the engine starts and thereafter, the exhaust gas post processing device is warmed up, when a fuel efficiency mode is selected, some exhaust gas discharged from the joint of the engine exhaust manifold and confined in the exhaust gas pick-up space may be circulated to the EGR cooler and the engine intake manifold and residual exhaust gas may be fed back and supplied to the joint of the engine exhaust manifold.

In still yet another preferred embodiment, after the engine starts and thereafter, the exhaust gas post processing device is warmed up, when a heating mode is selected, the exhaust gas discharged from the joint of the engine exhaust manifold and confined in the exhaust gas pick-up space may remain in the exhaust gas pick-up space so as to exchange heat with a cooling water circulated to a heater core.

In a further preferred embodiment, some of the exhaust gas which exchanges heat with the cooling water may be circulated to the EGR cooler and the engine intake manifold and residual exhaust gas may be fed back and supplied to the joint of the engine exhaust manifold.

In another further preferred embodiment, after the engine starts and thereafter, the exhaust gas post processing device is warmed up, when it is determined that a vehicle is in a rapid acceleration mode, the exhaust gas discharged from the joint of the engine exhaust manifold may bypass to the exhaust gas post processing device through the exhaust gas pick-up space.

Through the aforementioned problem solving means, the present disclosure provides the following effects.

First, exhaust gas on a rear end of an exhaust gas purifying device before warming-up is supplied to an exhaust gas pick-up space of an exhaust heat recovery chamber in an initial stage after an engine starts and exhaust gas that flows between a front end of an exhaust gas post processing device or a rear end of the exhaust gas post processing device and a front end of the exhaust gas purifying device is supplied to the exhaust gas pick-up space of the exhaust heat recovery chamber from the time when the warming-up of the exhaust gas purifying device ends, and as a result, the exhaust gas can be recirculated to an EGR cooler while the temperature is lowered through exchanging heat with cooling water, thereby increasing cooling efficiency of the EGR cooler.

Second, the exhaust gas on the front end of the exhaust gas post processing device is picked up according to a fuel efficiency mode and a heating mode and supplied to the exhaust gas pick-up space of the exhaust heat recovery chamber, and as a result, the exhaust gas can be recirculated to the EGR cooler while the temperature of the exhaust gas is lowered through exchanging heat with the cooling water to increase the cooling efficiency of the EGR cooler and improve fuel efficiency and high-temperature cooling water which exchanges heat with the exhaust gas is circulated to a heater core to improve heating efficiency.

Third, the exhaust gas exchanges heat with the cooling water in the exhaust gas pick-up space of the exhaust heat recovery chamber and thereafter, is fed back and supplied to a joint of an exhaust manifold, and as a result, an average use temperature of the exhaust manifold is lowered, thereby improving a life-span and durability of the exhaust manifold.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
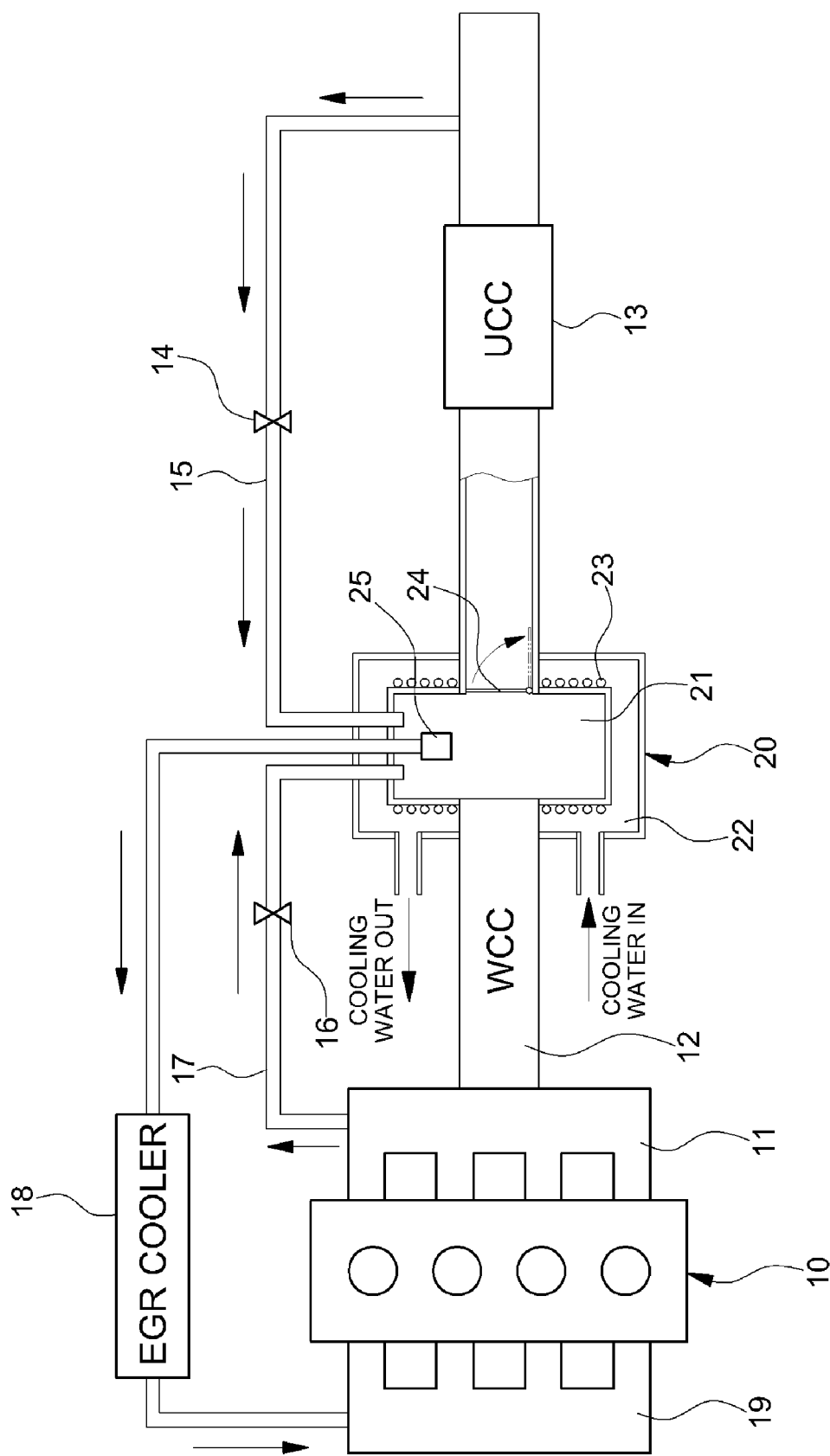
FIG. 1 is a configuration diagram illustrating a system for controlling exhaust heat recovery and an EGR according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, a preferred embodiment of the present disclosure will be described in detail with reference to the accompanying drawings.

First Embodiment

FIG. 1 is a configuration diagram illustrating a system for controlling exhaust heat recovery and an EGR according to an embodiment of the present disclosure.

As a three-element catalyst device considering that an exhaust gas regulation value gradually increases, an exhaust gas post processing device 12, mounted close to an exhaust manifold 11 of an engine 10 so that warming-up is more rapidly performed, and an exhaust gas purifying device 13, mounted on an exhaust line that extends from a rear end of the exhaust gas post processing device, are used together.

For reference, the warming-up means the temperature of the exhaust gas post processing device or the exhaust gas purifying device rising up to a temperature to purify the exhaust gas as the exhaust gas post processing device or the exhaust gas purifying device receives high-temperature exhaust gas.

According to the first embodiment of the present disclosure, an exhaust heat recovery chamber 20 is mounted at an outlet side of the exhaust gas post processing device 12, that is, on a front location of the exhaust gas purifying device 13 so that the exhaust gas exchanges heat with cooling water while the exhaust gas is picked up and confined.

The exhaust heat recovery chamber 20 is provided in a structure in which the exhaust heat recovery chamber 20 is partitioned into two spaces of an inner exhaust gas pick-up space 21 and an outer cooling water flow passage 22, and is mounted on the outlet of the exhaust gas post processing device 12, that is, on the front location of the exhaust gas purifying device 13.

In more detail, the exhaust heat recovery chamber 20 includes the exhaust gas pick-up space 21 having therein a predetermined volume, which may pick up and confine at least one of exhaust gas that flows on the rear end of the exhaust gas purifying device, exhaust gas that flows on the front end of the exhaust gas post processing device, and exhaust gas that flows on the rear end of the exhaust gas post processing device. The exhaust gas pick-up space 21 may also have a structure, in which the cooling water flow passage 22 for exchanging the heat with the exhaust gas, formed on the inside of the outer wall and a front end of the exhaust heat recovery chamber 20 and connected to be in communication with the outlet of the exhaust gas post processing device 12, and a rear end of the exhaust heat recovery chamber 20 is connected to be in communication with the exhaust line toward the exhaust gas purifying device 13.

Preferably, a heat exchanger (for example, a heat coil or pipe type) 23 for exchanging heat between the cooling water that flows in the cooling water flow passage 22 and the exhaust gas in the exhaust gas pick-up space 21 is mounted on an inner wall surface of the exhaust heat recovery chamber 20.

In this case, a first exhaust gas recovery line 15 having a first opening/closing valve 14 is connected between the rear end of the exhaust gas purifying device 13 and the exhaust gas pick-up space 21 of the exhaust heat recovery chamber 20, so as to recirculate and supply the exhaust gas on the rear end of the exhaust gas purifying device to the exhaust gas pick-up space 21.

A second exhaust gas recovery line 17 having a second opening/closing valve 16 is connected between the front end of the exhaust gas post processing device 12 and the exhaust gas pick-up space 21 of the exhaust heat recovery chamber 20, so as to recirculate exhaust gas discharged from a joint of an exhaust manifold 11 to the exhaust gas pick-up space 21.

Meanwhile, a bypass valve 24 opened/closed by an electric signal is mounted on the outlet of the exhaust heat recovery chamber 20, that is, a portion which is connected to be in communication with the exhaust line toward the exhaust gas purifying device 13.

In the case where at least one of the exhaust gas that flows on the rear end of the exhaust gas purifying device, the exhaust gas that flows on the front end of the exhaust gas post processing device, and the exhaust gas that flows on the rear end of the exhaust gas post processing device is supplied to the exhaust gas pick-up space 21 when the bypass valve 24 is closed, the exhaust gas is temporarily confined in the exhaust gas pick-up space 21 and the exhaust gas bypasses to the exhaust gas purifying device 13 when the bypass valve 24 is opened.

An EGR valve 25 is embedded in the exhaust heat recovery chamber 20 to be opened and closed by the electric signal in order to circulate the exhaust gas in the exhaust gas pick-up space 21 to an EGR cooler 18 and an engine intake manifold 19.

Therefore, when the EGR valve 25 is opened, the exhaust gas in the exhaust gas pick-up space 21 is recirculated to the EGR cooler 18 and the engine intake manifold 19.

Herein, an operational flow of the system for controlling exhaust heat recovery and an EGR according to the first embodiment of the present disclosure will be described below.

First, during a predetermined period (approximately 350 seconds) until the warming-up of the exhaust gas purifying device 13 and the exhaust gas post processing device 12 is performed after the engine starts, the exhaust gas on the rear end of the exhaust gas purifying device 13 is supplied into the exhaust gas pick-up space 21 of the exhaust heat recovery chamber 20.

That is, after the engine starts, the exhaust gas sequentially passes through the exhaust gas post processing device before warming-up, the exhaust gas pick-up space 21, the bypass valve 24 in the opened state, and the exhaust gas purifying device 13 before the warming-up. As a result, the exhaust gas on the rear end of the exhaust gas purifying device 13 is recirculated and supplied to the exhaust gas pick-up space 21 through a first exhaust gas recovery line 15 and in this case, a first opening/closing valve 14 of the first exhaust gas recovery line 15 is controlled to be in the opened state.

In this case, since the exhaust gas purifying device 13 is before the warming-up, that is, before the temperature of the exhaust gas purifying device 13 rises up to a temperature to purify the exhaust gas, the exhaust gas recirculated and supplied to the exhaust gas pick-up space 21 from the rear end of the exhaust gas purifying device 13 has a lower temperature than the exhaust gas passing through the exhaust gas purifying device 13 after the warming-up. The exhaust gas is supplied to the EGR cooler 18 through the EGR valve 25, which is controlled to be opened to improve cooling efficiency of the EGR cooler as compared with a case in which the temperature of the exhaust gas is high, and as a result the cooling efficiency of the EGR cooler deteriorates.

Next, when the warming-up of the exhaust gas purifying device is performed after the engine starts (a section after approximately 350 seconds), since the exhaust gas that flows between the rear end of the exhaust gas post processing device 12 and the front end of the exhaust gas purifying device 13 has a lower temperature than the exhaust gas passing through the exhaust gas purifying device 13, the exhaust gas that flows between the rear end of the exhaust gas post processing device 12 and the front end of the exhaust gas purifying device 13 is confined in the exhaust gas pick-up space 21 of the exhaust heat recovery chamber 20 by controlling the bypass valve 24 to be closed.

In this case, the exhaust gas confined in the exhaust gas pick-up space 21 exchanges heat with the cooling water that flows in the cooling water flow passage 22 through the heat exchanger 23 to be at a lower temperature.

Subsequently, the heat-exchanged exhaust gas is supplied to the EGR cooler 18 through the EGR valve 25 which is controlled to be opened to improve the cooling efficiency of the EGR cooler as compared with the case in which the temperature of the exhaust gas is high, and as a result, the cooling efficiency of the EGR cooler deteriorates in the related art.

Next, when both the exhaust gas purifying device 13 and the exhaust gas post processing device 12 are warmed up after the engine starts, the exhaust gas on the front end of the exhaust gas post processing device 12 is supplied into the exhaust gas pick-up space 21 of the exhaust heat recovery chamber 20.

That is, when both the exhaust gas purifying device 13 and the exhaust gas post processing device 12 are warmed up, since the temperature of the exhaust gas on the front end of the exhaust gas post processing device 12 is lower than the temperature of the exhaust gas on the rear end of the exhaust gas post processing device 12 by approximately 20 to 30° C., the exhaust gas on the front end of the exhaust gas post processing device 12 is supplied into the exhaust gas pick-up space 21 of the exhaust heat recovery chamber 20 through the second exhaust gas recovery line 17 and the supplied exhaust gas is confined in the exhaust gas pick-up space 21 by controlling the bypass valve 24 to be closed.

In this case, the temperature of the exhaust gas on the front end of the exhaust gas post processing device 12, which is confined in the exhaust gas pick-up space 21, is lower than the temperature of the exhaust gas on the rear end of the exhaust gas post processing device 12 by approximately 20 to 30° C. and the exhaust gas exchanges heat with the cooling water that flows in the cooling water flow passage 22 through the heat exchanger 23 to be at a lower temperature. The exhaust gas is supplied to the EGR cooler 18 through the EGR valve 25 which is controlled to be opened to improve the cooling efficiency of the EGR cooler as compared with the case in which the temperature of the exhaust gas is high, and as a result the cooling efficiency of the EGR cooler deteriorates in the related art.

Meanwhile the cooling efficiency of the EGR cooler is calculated by Equation 1 given below.

$$\text{cooling efficiency} = [(\text{difference in temperature of exhaust gas between front and rear ends of EGR cooler})/\text{temperature of exhaust gas on front end of EGR cooler} - \text{temperature of cooling water})] \qquad \text{Equation 1)}$$

Since the temperature of the exhaust gas supplied to the EGR cooler 18 through the EGR valve 25, that is, the temperature of the exhaust gas on the front end of the EGR cooler written in a denominator of Equation 1 given above decreases, the cooling efficiency of the EGR cooler may be increased.

Second Embodiment

Figure 2:
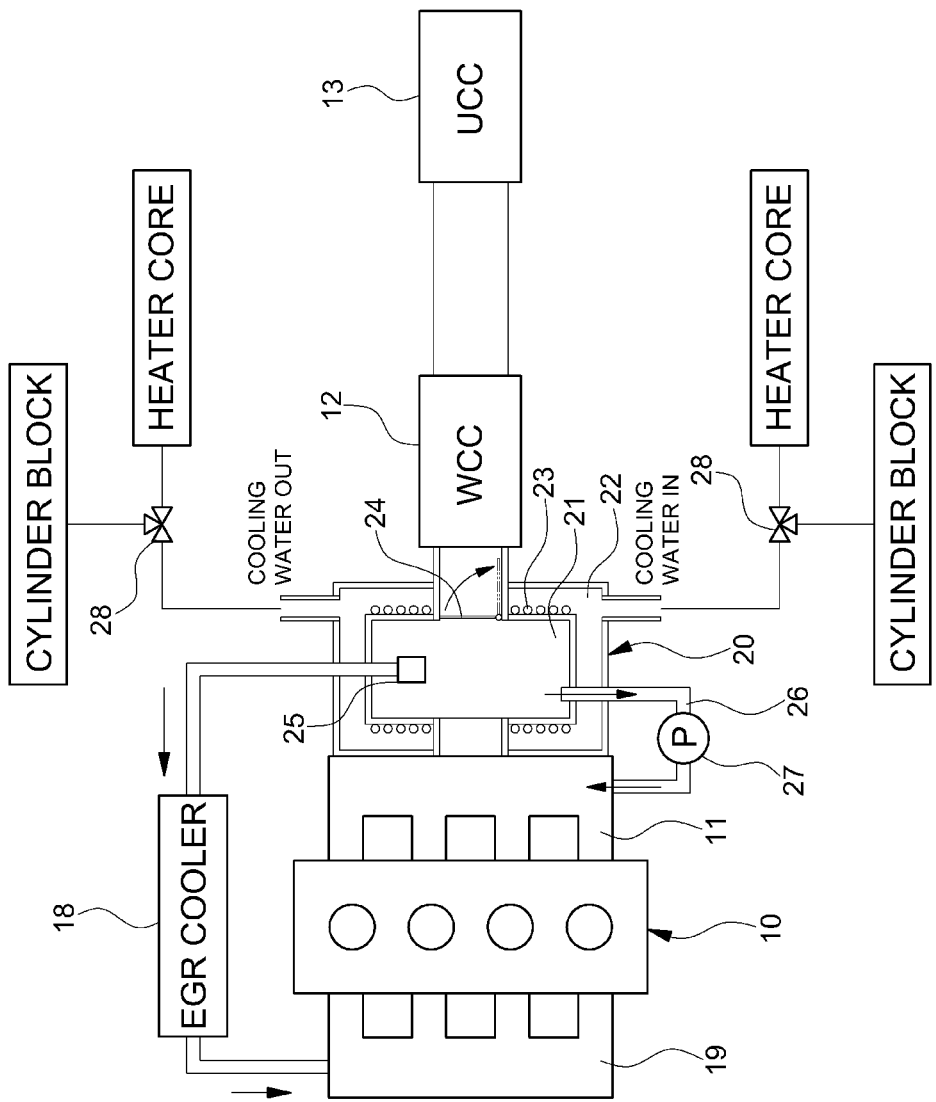
FIG. 2 is a configuration diagram illustrating a system for controlling exhaust heat recovery and an EGR according to another embodiment of the present disclosure.
Figure 3:
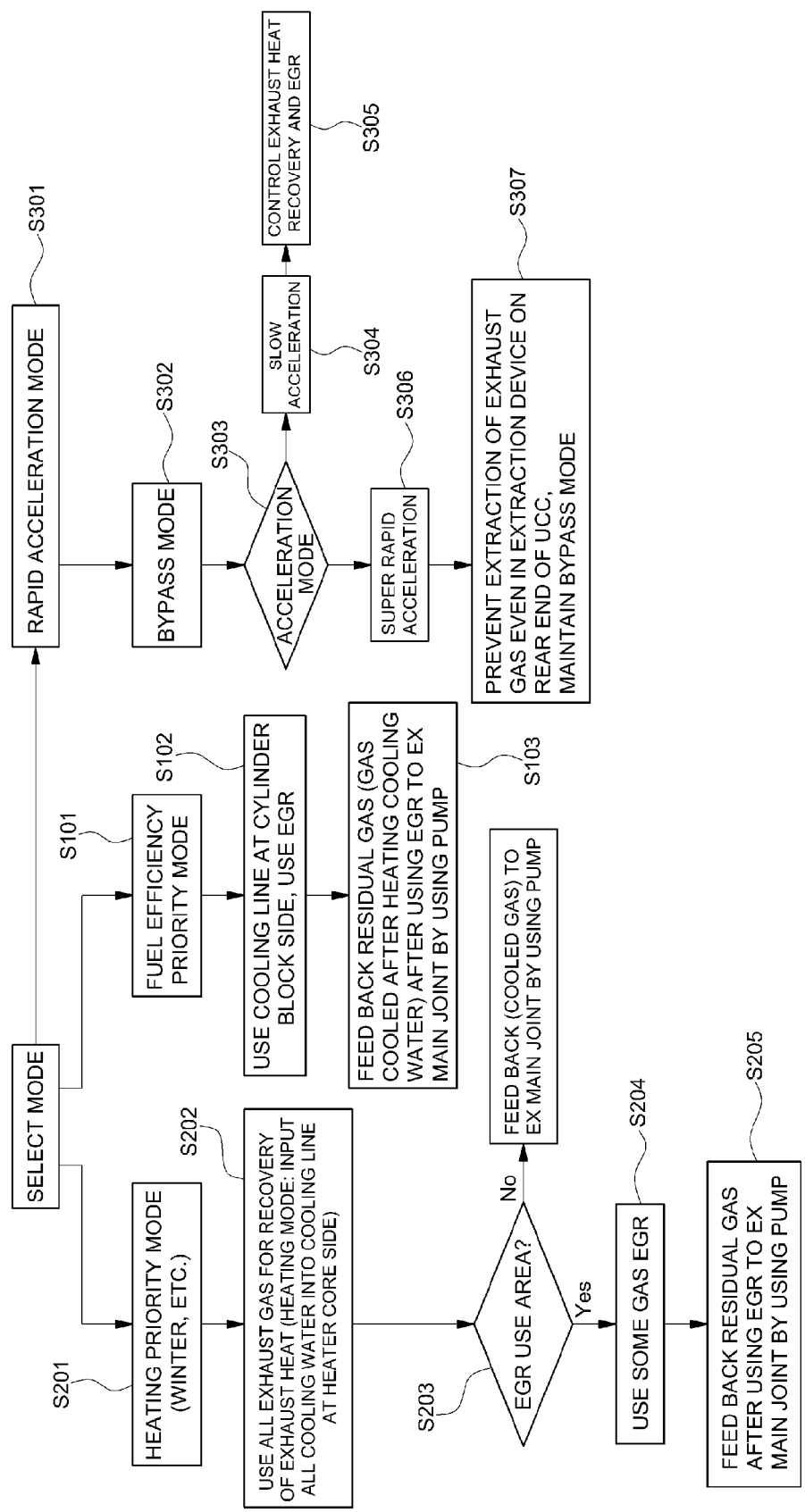
FIG. 3 is a flowchart illustrating an operational flow of a system for controlling exhaust heat recovery and an EGR according to another embodiment of the present disclosure.

FIG. 2 is a configuration diagram illustrating a system for controlling exhaust heat recovery and an EGR according to another embodiment of the present disclosure. FIG. 3 is a flowchart illustrating an operational flow of the system.

According the second embodiment of the present disclosure, the exhaust heat recovery chamber 20 is mounted on an inlet of the exhaust gas post processing device 12, that is, on a rear location of the joint of the exhaust manifold 11 so that the exhaust gas exchanges heat with the cooling water while the exhaust gas is picked up and confined.

The exhaust heat recovery chamber 20 is provided in a structure in which the exhaust heat recovery chamber 20 is partitioned into two spaces including the inner exhaust gas pick-up space 21 and the outer cooling water flow passage 22, and is mounted on the inlet of the exhaust post processing device 12, that is, on the rear location of the joint of the exhaust manifold 11.

In more detail, the exhaust heat recovery chamber 20 has the exhaust gas pick-up space 21 having therein a predetermined volume, which may confine exhaust gas that flows from the joint of the exhaust manifold 11 to the exhaust gas post processing device 12. The exhaust gas pick-up space 21 may also have a structure in which the cooling water flow passage 22 for exchanging the heat with the exhaust gas is formed on the inside of the outer wall and the front end of the exhaust heat recovery chamber 20 is connected to be in communication with the joint of the exhaust manifold 11 and the rear end of the exhaust heat recovery chamber 20 is connected to be in communication with the inlet of the exhaust gas post processing device 12.

Preferably, the heat exchanger (for example, the heat coil or pipe type) 23 for exchanging heat between the cooling water that flows in the cooling water flow passage 22 and the exhaust gas in the exhaust gas pick-up space 21 is mounted on the inner wall surface of the exhaust heat recovery chamber 20.

The bypass valve 24 opened and closed by the electric signal is mounted on the outlet of the exhaust heat recovery chamber 20, that is, a portion connected with the exhaust gas post processing device 12.

In the case where the exhaust gas that flows from the joint of the exhaust manifold 11 to the exhaust gas post processing device 12 is supplied into the exhaust gas pick-up space 21 when the bypass valve 24 is closed, the exhaust gas is temporarily confined in the exhaust gas pick-up space 21 and the exhaust gas bypasses to the exhaust gas post processing device 12 when the bypass valve 24 is opened.

The EGR valve 25 is embedded in the exhaust heat recovery chamber 20 to be opened and closed by the electric signal in order to circulate the exhaust gas in the exhaust gas pick-up space 21 to the EGR cooler 18 and the engine intake manifold 19.

Therefore, when the EGR valve 25 is controlled to be opened, the exhaust gas in the exhaust gas pick-up space 21 is recirculated to the EGR cooler 18 and the engine intake manifold 19.

According to the second embodiment of the present disclosure, an exhaust gas feed-back passage 26 is connected between the exhaust gas pick-up space 21 and the joint of the engine exhaust manifold 11, and a pump 27 is mounted on the exhaust gas feed-back passage 26, which pumps the exhaust gas in the exhaust gas pick-up space 21 to the joint of the engine exhaust manifold 11.

The reason for using the pump 27 is that the exhaust gas in the exhaust gas pick-up space 21 is easily fed back and supplied to the joint of the engine exhaust manifold 11 since back pressure of the joint of the exhaust manifold 11 is higher than the pressure of the exhaust gas pick-up space 21, and that a reverse gas flow is prevented since the exhaust gas in the exhaust gas pick-up space 21 may show a reverse gas flow to the front end of the exhaust gas post processing device 12 and the joint of the exhaust manifold 11.

Meanwhile, the inlet and the outlet of the cooling water flow passage 22 of the exhaust heat recovery chamber 20 is connected with a cooling water flow path of a cylinder block to be circulated by controlling a switching operation of a 3-way valve 28 or connected with a cooling water flow path of a heater core for heating to be circulated.

Herein, an operational flow of the system for controlling exhaust heat recovery and an EGR according to the second embodiment of the present disclosure will be described below.

First, after the engine starts, extraction of the exhaust gas is prevented for approximately 30 seconds for warming up the exhaust gas post processing device 12.

After the engine starts and thereafter, the exhaust gas post processing device is warmed up. When a driver selects a fuel efficiency mode (S101), the inlet and the outlet of the cooling water flow passage 22 of the exhaust heat recovery chamber 20 are connected with the cooling water flow path of the cylinder block so as to circulate the cooling water by controlling the switching operation of the 3-way valve 28 (S102).

Subsequently, the exhaust gas discharged from the joint of the engine exhaust manifold 11 is confined in the exhaust gas pick-up space 21 of the exhaust heat recovery chamber 20 and in this case, the bypass valve 24 is controlled to be closed.

In this case, the exhaust gas confined in the exhaust gas pick-up space 21 exchanges heat with the cooling water that flows in the cooling water flow passage 22 through the heat exchanger 23 to be at the lower temperature.

Subsequently, some of the heat-exchanged exhaust gas is supplied to the EGR cooler 18 through the EGR valve 25 which is controlled to be opened (S102) to improve the cooling efficiency of the EGR cooler as compared with the case in which the temperature of the exhaust gas is high, and as a result, the cooling efficiency of the EGR cooler deteriorates in the related art.

Simultaneously, residual exhaust gas of the heat-exchanged exhaust gas is fed back and supplied to the joint of the engine exhaust manifold 11 through the exhaust gas feed-back passage 26 by pumping force of the pump 27 (S103), and as a result, a life-span and durability of the exhaust manifold are improved by lowering the temperature of the exhaust manifold.

After the engine starts and thereafter, the exhaust gas post processing device is warmed up. When the driver selects a heating mode (S201), the inlet and the outlet of the cooling water flow passage 22 of the exhaust heat recovery chamber 20 are connected with the cooling water flow path of the heater core for heating so as to circulate the cooling water by controlling the switching operation of the 3-way valve 28.

Subsequently, the exhaust gas discharged from the joint of the engine exhaust manifold 11 is confined in the exhaust gas pick-up space 21 of the exhaust heat recovery chamber 20 and in this case, the bypass valve 24 is controlled to be closed.

In this case, the exhaust gas confined in the exhaust gas pick-up space 21 first is not supplied to the EGR cooler 18 through the EGR valve 25 and also exchanges heat with the cooling water that flows in the cooling water flow passage 22 through the heat exchanger 23 while not being fed back and supplied to the joint of the engine exhaust manifold 11 through the exhaust gas feed-back passage 26 to be at the lower temperature and the cooling water becomes in a high-temperature state (S202).

The cooling water, which is in the high-temperature state after the heat exchange, is circulated to the cooling water flow path of the heater core, and as a result, heating efficiency of the heater core for heating, that is, heat-exchange efficiency with indoor/outdoor air may be increased and indoor heating may be rapidly achieved in the wintertime.

In this case, it is determined whether there is an EGR using area of the vehicle (S203) and when it is determined that there is the EGR using area, some of the heat-exchanged exhaust gas is supplied to the EGR cooler 18 through the EGR valve 25 which is controlled to be opened (S204) to improve the cooling efficiency of the EGR cooler as compared with the case in which the temperature of the exhaust gas is high. As a result, the cooling efficiency of the EGR cooler deteriorates in the related art.

Simultaneously, residual exhaust gas of the heat-exchanged exhaust gas is fed back and supplied to the joint of the engine exhaust manifold 11 through the exhaust gas feed-back passage 26 by the pumping force of the pump 27 (S205), and as a result, the life-span and the durability of the exhaust manifold are improved by lowering the temperature of the exhaust manifold.

After the engine starts and thereafter, the exhaust gas post processing device is warmed up. When it is determined that the vehicle is in a rapid acceleration mode (S301), the exhaust gas discharged from the joint of the engine exhaust manifold 11 enters a bypass mode to bypass to the exhaust gas post processing device 12 through the exhaust gas pick-up space 21 of the exhaust heat recovery chamber 20 (S302) and in this case, the bypass valve 24 is controlled to be opened.

Subsequently, it is monitored whether the vehicle is continuously in the acceleration mode (S303) and when it is determined that the vehicle is in a slow acceleration state (S304), a process of controlling the exhaust heat recovery and the EGR in the fuel efficiency mode or the heating mode may be performed (S305).

On the contrary, it is monitored whether the vehicle is continuously in the acceleration mode (S303) and when it is determined that the vehicle is in a super acceleration mode (S306), the exhaust gas discharged from the joint of the engine exhaust manifold 11 bypasses to the exhaust gas post processing device 12 through the exhaust gas pick-up space 21 of the exhaust heat recovery chamber 20. Further, the exhaust gas is not extracted even on the rear end of the exhaust gas purifying device 13 and exhausted to the outside (S307).

The reason for using the bypass mode as described above is that exhaust pressure is maintained at a high level due to the resistance of the exhaust gas that flows to the exhaust gas pick-up space 21 of the exhaust heat recovery chamber 20 during acceleration or rapid acceleration and when the exhaust gas does not bypass, rapid acceleration performance may deteriorate. As a result, in an acceleration situation in which full power of the engine is required, the bypass mode in which the exhaust gas is discharged to outdoor air through the exhaust gas post processing device and the exhaust gas purifying device should be used.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A system for controlling exhaust heat recovery and an exhaust gas recirculation system (EGR), the system comprising:
   an exhaust gas post processing device mounted on an outlet of an engine exhaust manifold;
   an exhaust gas purifying device mounted on an exhaust line that extends from an outlet of the exhaust gas post processing device;
   an exhaust heat recovery chamber having an exhaust gas pick-up space configured to pick up and confine at least one of exhaust gas that flows at a rear end of the exhaust gas purifying device, exhaust gas that flows at a front end of the exhaust gas post processing device, or exhaust gas that flows at a rear end of the exhaust gas post processing device, and further having a structure in which a cooling water flow passage for exchanging heat with the exhaust gas is disposed on the outside of the exhaust gas pick-up space, wherein a front end of the exhaust heat recovery chamber is connected to, and fluidly communicates with, the outlet of the exhaust gas post processing device, and a rear end of the exhaust heat recovery chamber is connected to, and fluidly communicates with, the exhaust line extending toward an inlet of the exhaust gas purifying device;
   a bypass valve mounted on an outlet of the exhaust heat recovery chamber to be opened and closed to temporarily confine the exhaust gas or bypass to the exhaust gas purifying device; and
   an EGR valve mounted on the exhaust heat recovery chamber to be opened and closed to circulate the exhaust gas in the exhaust gas pick-up space to an EGR cooler and an engine intake manifold,
   wherein a first exhaust gas recovery line having a first opening and closing valve is connected between the rear end of the exhaust gas purifying device and the exhaust gas pick-up space of the exhaust heat recovery chamber.

2. The system of claim 1, wherein a heat exchanger for exchanging heat between cooling water in the cooling water flow passage and the exhaust gas in the exhaust gas pick-up space is further mounted on an inner wall surface of the exhaust heat recovery chamber.

3. The system of claim 1, wherein a second exhaust gas recovery line having a second opening and closing valve is connected between the front end of the exhaust gas post processing device and the exhaust gas pick-up space of the exhaust heat recovery chamber.

4. The system of claim 1, wherein during a predetermined period until the exhaust gas purifying device and the exhaust gas post processing device are warmed up after an engine starts, the exhaust gas at the rear end of the exhaust gas purifying device is supplied into the exhaust gas pick-up space of the exhaust heat recovery chamber.

5. The system of claim 1, wherein when the engine starts and thereafter, the exhaust gas purifying device is warmed up and the exhaust gas that flows between the rear end of the exhaust gas post processing device and a front end of the exhaust gas purifying device remains in the exhaust gas pick-up space of the exhaust heat recovery chamber.

6. The system of claim 1, wherein when the engine starts and thereafter, both the exhaust gas purifying device and the exhaust gas post processing device are warmed up and the exhaust gas at the front end of the exhaust gas post processing device is supplied into the exhaust gas pick-up space of the exhaust heat recovery chamber.

7. A system for controlling exhaust heat recovery and an exhaust gas recirculation system (EGR), the system comprising:
- an exhaust gas post processing device mounted on an outlet of an engine exhaust manifold;
- an exhaust gas purifying device mounted on an exhaust line that extends from an outlet of the exhaust gas post processing device;
- an exhaust heat recovery chamber having an exhaust gas pick-up space configured to pick up and confine exhaust gas that flows at a front end of the exhaust gas post processing device, and further having a structure in which a cooling water flow passage for exchanging heat with the exhaust gas is disposed on the outside of the exhaust gas pick-up space, wherein a front end of the exhaust heat recovery chamber is connected to, and fluidly communicates with, a joint of the engine exhaust manifold, and a rear end of the exhaust heat recovery chamber is connected to, and fluidly communicates with, an inlet of the exhaust gas post processing device;
- a bypass valve mounted on an outlet of the exhaust heat recovery chamber to be opened and closed to temporarily confine the exhaust gas or bypass to the exhaust gas post processing device; and
- an EGR valve mounted on the exhaust heat recovery chamber to be opened and closed to circulate the exhaust gas in the exhaust gas pick-up space to an EGR cooler and an engine intake manifold,
- wherein an exhaust gas feed-back passage is connected between the exhaust gas pick-up space and the joint of the engine exhaust manifold, and a pump pumping the exhaust gas in the exhaust gas pick-up space to the joint of the engine exhaust manifold is mounted on the exhaust gas feed-back passage.

8. The system of claim 7, wherein a heat exchanger for exchanging heat between cooling water in the cooling water flow passage and the exhaust gas in the exhaust gas pick-up space is further mounted on an inner wall surface of the exhaust heat recovery chamber.

9. The system of claim 7, wherein an inlet and an outlet of the cooling water flow passage are connected with a cylinder block or a heater core so as to circulate cooling water by a switching operation of a 3-way valve.

10. The system of claim 7, wherein after the engine starts and thereafter, the exhaust gas post processing device is warmed up, and when a fuel efficiency mode is selected, some exhaust gas discharged from the joint of the engine exhaust manifold and confined in the exhaust gas pick-up space is circulated to the EGR cooler, and the engine intake manifold and residual exhaust gas is fed back and supplied to the joint of the engine exhaust manifold.

11. The system of claim 7, wherein after the engine starts and thereafter, the exhaust gas post processing device is warmed up, and when a heating mode is selected, the exhaust gas discharged from the joint of the engine exhaust manifold and confined in the exhaust gas pick-up space remains in the exhaust gas pick-up space so as to exchange heat with a cooling water circulated to a heater core.

12. The system of claim 11, wherein some of the exhaust gas which exchanges heat with the cooling water is circulated to the EGR cooler and the engine intake manifold and residual exhaust gas is fed back and supplied to the joint of the engine exhaust manifold.

13. The system of claim 7, wherein after the engine starts and thereafter, the exhaust gas post processing device is warmed up, and when it is determined that a vehicle is in a rapid acceleration mode, the exhaust gas discharged from the joint of the engine exhaust manifold bypasses to the exhaust gas post processing device through the exhaust gas pick-up space.

* * * * *